United States Patent [19]
Mikolajczyk

[11] Patent Number: 4,787,244
[45] Date of Patent: Nov. 29, 1988

[54] WELL PIPE OR OBJECT DEPTH INDICATOR

[76] Inventor: Raymond F. Mikolajczyk, Rte. 1, Box 57-A, Broussard, La. 70518

[21] Appl. No.: 154,271

[22] Filed: Feb. 10, 1988

Related U.S. Application Data

[63] Continuation of Ser. No. 556,106, Nov. 29, 1983, abandoned, which is a continuation-in-part of Ser. No. 523,102, Aug. 15, 1983, abandoned.

[51] Int. Cl.$^4$ ............................................. E21B 47/00
[52] U.S. Cl. ..................................... 73/151; 33/125 R
[58] Field of Search .............................. 73/151, 151.5; 33/125 R

[56] References Cited

U.S. PATENT DOCUMENTS

| | | | |
|---|---|---|---|
| 3,017,770 | 1/1962 | Green | 73/151.5 |
| 3,643,504 | 2/1972 | Rundell | 73/151.5 |
| 3,777,560 | 12/1973 | Guignard | 73/151.5 |
| 3,916,684 | 11/1975 | Rundell | 73/151.5 |
| 4,114,435 | 9/1978 | Patton et al. | 73/151.5 |
| 4,156,467 | 5/1979 | Patton et al. | 173/21 |
| 4,459,752 | 7/1984 | Babcock | 33/134 |

*Primary Examiner*—Jerry W. Myracle
*Attorney, Agent, or Firm*—Jack W. Hayden

[57] ABSTRACT

A movement measuring device includes circuitry which produces signals functionally related to the amount and direction of movement of a cable or drill line in relation to up and down movement of an object such as pipe and the like in a well bore. A totalizer device is provided with circuitry that is coupled to the movement measuring device to instrumentally display the object depth in the well bore resulting from the signals received from the movement measuring device. A switch is operatively connected to the cable or drill line and a device closes the switch when a predetermined weight or load on the cable or drill line is exceeded to provide power from a power source to the movement measuring device for transmitting the signals therefrom to the totalizer device. The totalizer device continuously displays the total depth of the object in the well bore.

8 Claims, 1 Drawing Sheet

U.S. Patent        Nov. 29, 1988        4,787,244
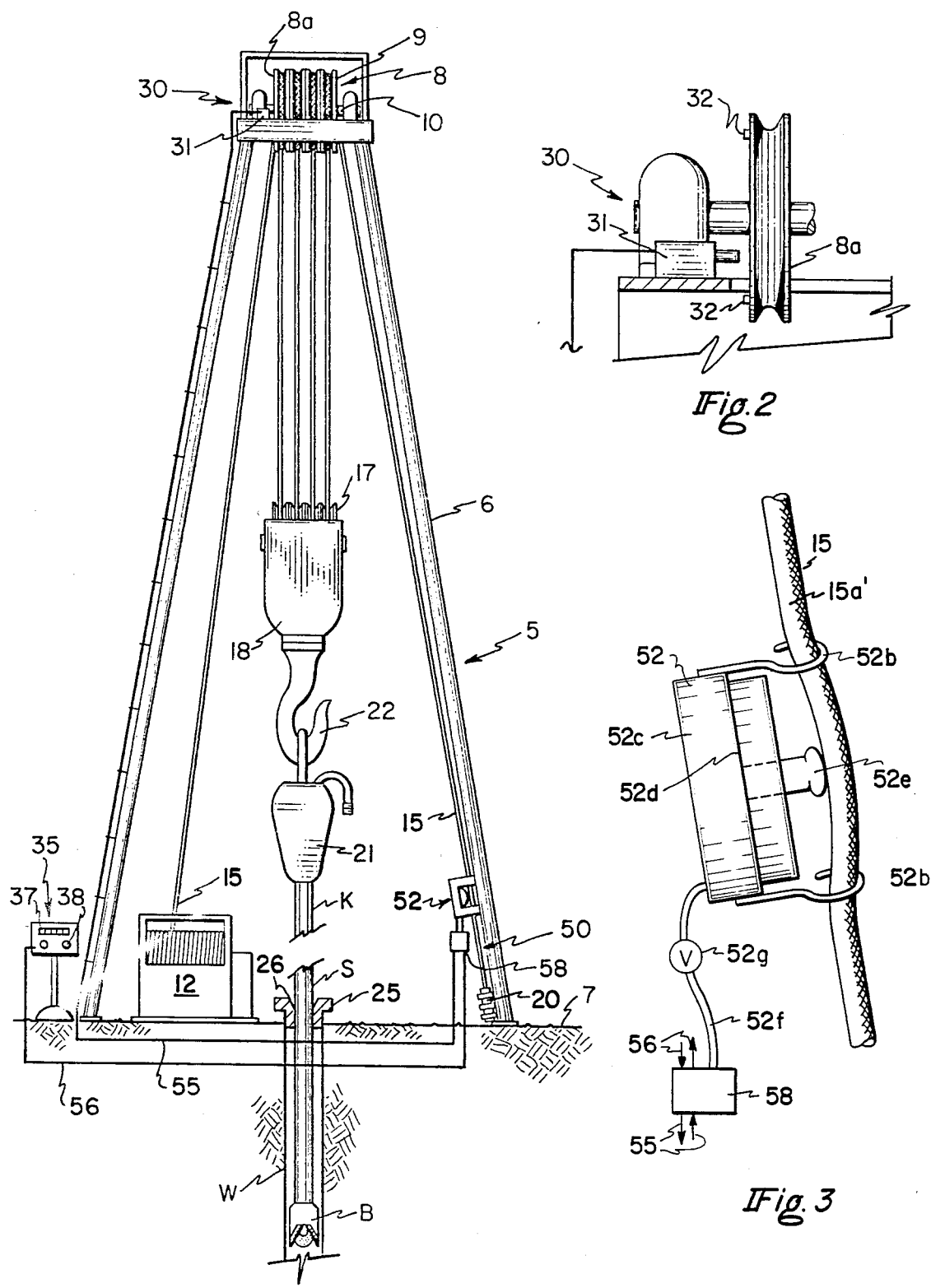

WELL PIPE OR OBJECT DEPTH INDICATOR

CROSS REFERENCE TO RELATED APPLICATIONS

This application is a continuation of my prior application filed Nov. 29, 1983 for WELL PIPE OR OBJECT DEPTH INDICATOR bearing Ser. No. 06/556,160 now abandoned which is a continuation-in-part of my prior copending application filed Aug. 15, 1983 for DRILL BIT DEPTH INDICATOR bearing Ser. No. 06/523,102, now abandoned.

BACKGROUND OF THE INVENTION

Various devices and arrangements have been attempted to provide a continuous readout of the drill bit depth as drilling operations are conducted to drilling as well bore or as pipe or other objects are raised and lowered in a well bore. Generally speaking, all of such devices have presented various problems, some of which are due to the fact that the drill string on which the drill bit is connected is generally formed by joints of pipe, and the drill string is supported for up and down movement in a drilling mast at the earth's surface. The drill line is anchored at one end, called the dead line anchor, generally adjacent a leg of the drilling mast. The drill line extends from the anchor upwardly to a crown block formed of a plurality of rotatable sheaves supported on top of the upper end of the drilling mast. The drill line is reeved about the sheaves in the crown block and extends from one of the sheaves down to a sheave in what is termed a traveling block and then back up to a sheave in the crown block, etc., until the desired number of sheaves in the crown block and traveling block have the cable received thereon, and the drill line then extends from the crown block downwardly to a powered rotatable drum in what is normally termed the drawworks. The traveling block is provided with suitable means for removably connecting with the drill string to suspend it in the well bore, but enabling the traveling block to be disconnected from the drill string when necessary to conduct other operations.

During drilling or the other operations, measuring or displaying the depth of the drill bit, pipe, or other objects is complicated in that uninterrupted and continuous lowering of the drill string, pipe or other objects, during drilling, hoisting and other operations is not practical. For example, there are devices available on the market that measure the total depth of a sand line, or wireline, in a well bore which is normally lowered into the well bore in substantially a continuous and uninterrupted manner. It can be appreciated that when the lowering operation is interrupted and more particularly when the measuring arrangement for determining the total depth of the drill bit on a drill string, pipe or other objects is operably associated with and responsive to the up and down movement of the drill line, the mesuring arrangement must be stopped and started at a time to correspond with the up and down movement of the drill line or cable. This is particularly true since the traveling block, when it is disconnected from the drill pipe or drill string, is used a lot of times without the drill pipe ever moving or without the bit moving up or down in the well bore.

SUMMARY OF THE INVENTION

The present invention provides an arrangement which is responsive to movement of the drill line to produce signals functionally related to the amount and direction of movement of the drill line or cable. Totalizer means are coupled to the movement measuring means for instrumentally displaying the total depth of the drill bit as a function of the signals received from the movement measuring means. Power is supplied to switch means, which switch means is operatively connected to the drill line to maintain it open or inoperative until a predetermined weight on the drill line or cable is exceeded. When this occurs, the switch means is actuated to enable power to be transmitted to the movement measuring means for transmitting the signals therefrom to the totalizer means during the period that the predetermined weight is exceeded on the drill line.

A primary object of the present invention is to provide an arrangement for continuously measuring and displaying the depth of a drill bit, pipe or other objects supported on a well string, during drilling, tripping pipe or during other operations in a well bore in relation to the up and down movement of a cable which supports the well string or objects, and means for activating the measuring means only when a predetermined weight on the drill line is exceeded so that other operations utilizing up and down movement of the drill line may be conducted without affecting the measuring means or depth displayed.

Another object of the invention is to provide an arrangement for controlling when a totalizer device counts or does not count to indicate total depth of objects in a well bore.

Other objects and advantages of the present invention will become more readily apparant from a consideration of the following drawing and description.

BRIEF DESCRIPTION OF THE DRAWINGS

FIG. 1 is a schematic side view illustrating a drilling mast with the crown block on the upper end thereof and the drill line extending from the drawworks up to the crown block and then down to the traveling block and secured at one end to an anchor on the rig floor or substructure;

FIG. 2 is a schematic illustration of one form of the sensing means which may be used with the present invention; and FIG. 3 is an enlarged schematic diagram illustrating further details of the switch means.

DESCRIPTION OF THE PREFERRED EMBODIMENT

The present invention will be described in detail as it relates to a drilling operation utilizing a drill string with a drill bit on the lower end thereof. However, such explanation is by way of example only, as the present invention may be employed in conjunction with a workover rig which may not have all the associated equipment of a drilling rig. It may also be used to measure and display the total depth of tubing, casing, liners, cementing tools or other objects run in a well bore wherein it is desired to known the substantial exact location of the pipe end or object depth even though there may be intervening up and down movement of the pipe, or object, or mechanism which runs the pipe or object in the well.

Further, by way of example only, the invention will be described wherein electrical power is provided and the movement measuring means and totalizer means respond to electrical signals. However, in some situations, the power might be pneumatic or some other form to which the movement measuring and totalizer means responds.

Attention is first directed to FIG. 1 wherein a drilling rig or drilling mast is represented generally by the numeral 5. It is provided with legs 6 which extend upwardly from the ground 7 or from a substructure and carries a crown block 8 at its upper end. The crown block 8 is formed of a plurality of independently rotatable sheaves 9 carried on or supported on a shaft 10. The shaft 10 is supported on the top of the drilling mast 5. The drawworks referred to at 12 includes a powered rotatable drum on which is reeved a drill line 15. The drill line extends upwardly from the drawworks drum to one of the sheaves on the crown block 8 and then extends downwardly to one of a plurality of independently rotatable sheaves 17 in the traveling block 18 and thence backup to the next adjacent sheave in the crown block 8, and so forth, until the drill line 15 extends over the sheaves in the crown block 8 and traveling block 18 and then the end of the drill line extends downwardly from the last sheave in the crown block 8 to be anchored by any suitable means such as represented at 20 in any desired location, such as adjacent one of the legs 8 of the drilling mast, or derrick floor substructure. The portion of the drill line 15 extending from the drawworks 12 to the first sheave on crown block 8 is normally termed the "fast line" and that portion 15a from the last sheave in the crown block 8 to anchor 20 is termed the "deadline".

This arrangement is well known to those in the oil and gas well rotary drilling art and provides a means for conducting hoisting operations during normal drilling operations. During drilling, a device called a swivel schematically represented at 21 is supported on the hook 22 of the traveling block 18, and a noncircular member referred to as a kelly represented by the letter K is rotatably secured to the lower end of the switch 21 and the drill string represented by the letter S is secured to the lower end of the kelly K and is provided with a drill bit represented by the letter B at the lower end thereof for drilling the well bore in the earth's surface 7. This arrangement enables the rotary table 25 on the floor of the drilling mast 5 to rotate the kelly K and drill string S to drill the well bore.

The drill string S is made up of a plurality of joints of drill pipe which are sequentially threaded into the drill string in end to end relation as the hole is deepened. When it is desired to add another joint of drill pipe to the drill string S, the drill string S is raised by reeving in drill line 15 on drawworks 12 to raise traveling block 18, swivel 21 and kelly K until the upper end of drill string S projects upwardly above the rotary table 25. Slips 26 are then placed in the rotary table 25 to hold or support the drill string S on the well bore. Thereafter, the kelly K the lower end of which is above the rotary table is unthreaded from the upper end of the drill string S in a manner well known in the art and it and the swivel are mounted to connect the lower end of the kelly to another single joint of drill pipe. The kelly K and the single joint of drill pipe are then lifted upwardly into the drilling mast in a vertical position and then lowered to be threadedly connected, in a well known manner, to the end of the drill string projecting upwardly above the rotary table 25. It can be appreciated that this operation is repeated throughout the drilling operation of the well bore until the total depth of the well bore is reached.

The present invention provides a device for continuously measuring and displaying the total depth of the drill bit on the drill string S during hoisting and drilling operations. The interruption of drilling operations, addition of drill pipe joints to the drill string S, and the pulling of all the jointed pipe out of the well bore to change the drill bit or bottom hole assembly and the running of all the pipe back into the well bore has heretofore caused problems in measurement devices associated with drilling operations which endeavor to indicate the continuous depth of the drill bit B. Removal of the pipe and replacing it is normally referred to as "tripping".

The present invention overcomes the above and other problems in that the measurement mechanism is deactivated automatically during the time that operations are conducted which require that the drill line or cable be raised and lowered, such as when drill joints are picked up to be added to the drill string, or during the time that the drill string S is supported in the rotary table 25 by slips 26 and other operations conducted wherein the movement of the drill line is required to raise and lower the traveling block 18. The present invention permits such operations to be accomplished without affecting the total readout or total depth of the mechanism.

More specifically, suitable movement measuring means such as represented generally at 30 in FIGS. 1 and 2 include circuitry for producing signals, such as electrical signals functionally relating to the amount of movement and direction of movement, that is, up and down movement, of the drill line 15 between the drawworks 12 and crown block 8 which in turn relates to the up and down movement of the traveling block 18 and drill string S during drilling and hoisting operations to deepen the well bore. Totalizer means represented generally by the numeral 35 includes circuitry coupled to the movement measuring means 30 for instrumentally displaying as represented at 37 the total depth of the drill bit in feet or meters or in any other desired linear measurement as a function of the combined, totalized electrical signals received from the movement measuring means 30. Further, switch means represented generally by the numeral 50 include circuitry represented at 55 and 56, respectively, connected with a power source (not shown) and with the movement measuring means 30 and totalizer means 35 whereby power from the power source is provided to the movement measuring means 30 only during predetermined intervals, as will be described.

In the embodiment illustrated, the power source, when electrical signals are used, comprises battery means associated with the totalizer means 35 which supplies power to the totalizer means 35 at all times for continuous displaying the bit depth at 37 as previously indicated and without regard to whether switch 50 is open or closed. The line 56 maintains the power source in the totalizer means 35 connected with the switch 58 forming part of switch means 50 to continuously supply power to switch means 50.

The switch means 50 is operatively associated with the drill line 15 as diagrammatically represented at 52 and when a predetermined weight on the drill line 15 is exceeded, the switch means 50 closes so that power from the power source in the totalizer means 35 is supplied through the conduit 56, through the closed switch means 50 and to the line 55 to the movement measuring means 30 for producing electrical signals functionally related to the amount of movement and direction of movement of the drill line 15 between the drawworks 12 and crown block 8. The signals from movement measuring means 30 are relayed through another separate conduit also designated 55, back through the switch means 50 and a separate conduit 56 to totalizer means 35 as diagrammatically shown in FIG. 3.

All of the components employed with the present invention are standard components available on the market, the circuitry and details of which are well known to those skilled in the art so that a description thereof is believed unnecesary. For example, the movement measuring means includes a sensor represented schematically at 31 in FIGS. 1 and 2 for sensing rotation and direction of rotation of one of the sheaves, such as the sheave 8a in the crown block 8, over which the drill line 15 passes. The sensor in the illustrated embodiment is mounted on top of the mast 5 adjacent sheave 8a. This sensing mechanism as well as the totalizer means and associated power source 35 may be obtained from Electro-Flow Controls, Inc., Missouri City, Tex. The part number for the sensor is 95810051 and may be purchased with the length of cable 55 desired. The totalizer is identified as Model 5600, part 80815600. The switch 58 of switch means 50 is a pressure actuated switch, and one suitable form may be obtained from Custom Control Sensors, Inc., Model 611GCE1. Associated mechanism or pressure sensitive device 52 may be obtained from Martin Decker, Model 8A15, or from Geolograph.

The movement measuring means 30 includes the sensor 31 as previously noted and a plurality of magnets 32 mounted at suitable circumferentially spaced positions on the sheave 8a. The number of magnets such as from four to eight will depend upon the size of the sheave 8 and the accuracy of measurement desired.

In operation of the present invention in one embodiment, it can be appreciated that as the drill string S is rotated by the rotary table 25 during normal drilling operations to drill the well bore represented by the letter W, the drill line 15 is paid out from the drawworks 12 so as to support the traveling block 18 and drill string in the well bore in a known manner to accomplish the drilling at a desired rate. As the drill string S moves downwardly, the upward movement of the drill line 15 from the drawworks 12 to the crown block 8 causes the independently rotatable sheaves 9 therein to rotate including the sheave 8a on which the magnets 32 are mounted to lower traveling block 18, swivel 21 and kelly K to which the drill string S is connected. Rotation of the sheave 8a with the magnets thereon is sensed by the sensor 31 as the magnets pass by the sensor 31. Movement of each magnet 32 past the sensor 31 produces a directional electrical signal functionally related to the amount of movement and direction of movement of the drill line 15 between the drawworks 12 and the crown block 8. When the drill string is supported on the hook 22 as illustrated in FIG. 1 and as the drill string is lowered during drilling operations or anytime and traveling block 18 is lowered with the drill string supported on the hook 22, the signals produced by rotation of the sheave 8a and sensing thereof by the magnets passing the sensor 31 will produce an additive signal which is transmitted through the line 55 in the closed switch means 50 to the totalizer means 35. Similarly, when the traveling block 18 is moved upwardly in the drilling mast 5 with the drill string S supported on the hook 22 as shown in FIG. 1 of the drawings, the electrical signals functionally relate to such movement to reflect downward movement of the drill line 15 between the crown block 8 and drawworks 12 and these electrical signals will produce a signal supplied through the line 55, the switch means 50 and the line 56 to the totalizer to subtract such movement of the traveling block 18 is the mast 5 from the totalizer means 35.

As previously noted, when it is necessary to add another joint of drill pipe to the drill string S, the drill string S will be lifted by the traveling block 18 until the upper end of the drill string S is extending out of the well bore and projects through the rotary table 25. When this occurs, this movement is noted by sensor 31, in that the number of magnets passing sensor 31, and direction of rotation of sheave 8a provides signals which are related to the direction and amount of movement of drill line 15. These signals are transmitted through closed switch means 50 to totalizer 35 to subtract the distance that the drill string is raised from the display 37. Slip means 26 are positioned in the rotary table 25 and the kelly K and swivel 21 are removed from the drill string S and positioned so that another section of drill pipe can be picked up and then lifted into the derrick 5 and threadedly connected into the upwardly projecting end of the drill pipe S as previously described. It is then desirable to remove the slips 26 from the rotary table 25 so that the drill string can be lowered through the rotary table 25, and to accomplish this, it is necessary to lift the drill string S one or two feet to enable the slips to be physically removed from the rotary 25. This, of course, will subtract one or two feet additional from the totalizer means 35 since the sheave 8a will rotate in an opposite direction as the traveling block 18 moves upwardly to indicate downward movement of the drill line 15 between the crown block 8 and traveling block 18. However, when the drill string S is then lowered into the well bore, after the slips 26 have been removed, to resume drilling operations, the distance that the drill string S is lowered is noted by the sensor and such distance is added back to the totalizer means 35 since the sensor 31 cooperating with the magnets 32 transmits electrical signals to the totalizer means 35 as previously described which are functionally related to the upward movement and amount of upward movement of the drill line 15 paid out from drawworks 12 as drill string S is lowered and rotation of the sheave 8a in the opposite direction to that described when the drill string is raised.

From the foregoing, it can be appreciated that the traveling block 18 and drill line 15 will travel up and down during the operation of adding additional drill joints to the drill string S during drilling operations, and while the drill string S is supported in the rotary table 25 by slips 26 or during tripping. The present invention provides an arrangement to deactivate the measurement means 30 during operations when the weight carried by the travelling block 18 does not exceed a predetermined amount so that movement of the travelling block up and down in the mast 5 will not transmit signals from the movement measuring means which would provide a false reading of the total bit depth.

More specifically, the switch means 50 in the embodiment described is a pressure actuated arrangement such that it closes only when a load in excess of a predetermined weight or load is applied to the drill line 15 and thus is only closed to transmit directional electrical signals from the measurement means 30 to the totalizer means 35 when the weight on the drill line 15 exceeds the desired or predetermined minimum weight or load. The predetermined minimum weight or load to be carried by the drill line 15 without closing the switch means 50 may vary from rig to rig depending upon the size of the rig and other factors. Generally speaking, the desired predetermined minimum weight carried by the drill line 15 without closing the switch means 50 will normally be the weight of the traveling block 18 plus some additional amount depending upon the operation involved. For example, when the operation is drilling a well bore, the predetermined minimum weight which must be exceeded to close switch means 50 is the weight of the traveling block 18, swivel 21, kelly K and the weight of a joint of drill pipe. This permits the traveling block 18, swivel 21 and kelly K to be raised and lowered to pick up and connect the joint of drill pipe to the well string and to perform other operations while disconnected from the drill string and while the drill string is supported in the well bore by the rotary table without closing or activating switch means 50.

Attention is directed to FIG. 3 wherein the pressure sensitive device 52 and switch 58 forming switch means 50 is schematically shown. A portion 15a' of the deadline part 15a of drill line 15 is illustrated with pressure sensitive device 52 connected to, or operatively associated with deadline portion 15a in any suitable manner such as by mounting clamps, or brackets 52b. The device 52 includes a housing 52c which supports a diaphragm or movable membrane 52d therein. A plunger 52e is connected to movable diaphragm 52d and abuts deadline portion 15a' as shown.

A conduit 52f connects housing 52c with pressure actuated switch 58. A valve 52g in conduit 52f is provided so that the housing 52c on one side of diagram 52d can be initially charged with suitable fluid in an amount so that when the desired predetermined load is on the drill line 15, the force exerted on the diaphragm 52d by the plunger 52e resulting from the tension in deadline portion 15a on plunger 52e will cause slightly less fluid pressure in conduit 52f than that required to close pressure switch 58 so that normal operations, such as adding pipe joints to the drill string suspended in the well bore, which require up and down movement of the traveling block 18, etc. while disconnected from the drill string S supported in the rotary may be conducted without closing switch 58. In other words, the weight of the joint of pipe when added to the weight of the traveling block, swivel and kelly is not sufficient in and of itself to close switch 58. Thus, in drilling operations, the traveling block, swivel and kelly can be moved up and down to connect to a joint of drill pipe and then connected to the drill string S supported in the rotary table without closing switch 58. However, when the drill string with the added pipe joint length is picked up, this weight creates sufficient additional tension in deadline portion 15a to act on and cause plunger 52e and diaphragm 52d to move and increase the pressure in conduit 52f to actuate switch 58 and close it.

Thus, the switch means 50 including its associated mechanism 52 provides an arrangement whereby the associated mechanism 52 can be adjusted so that the switch 58 will remain open until a predetermined desired weight to be carried on drill line 15 is not exceeded.

Thereafter, drilling operations are initiated and continued or drill joints are added section by section as on bit trips or drilling as previously described hereinabove. As each drill joint is added and drilled down, the length of the drill joint is reflected on the digital readout since the weight acting on drill line 15 is sufficient to close the switch means 50 and the directional signal transmitted from the measuring means 30 through the closed switch means 50 to the totalizer means 35 causes the length of the drill joints to be added to the display 37 on the totalizer means 35.

It can be appreciated that the length of the drill string S may be as much as two to five miles or more, and the measurement means 30 conveys a signal through the closed switch means 50 as each joint of drill pipe is drilled down to enable another joint of pipe to be added to the drill string. As the joint is drilled down, the length thereof is reflected on the display 37. When drill pipe joints are added to the drill string S as the drill string S is suspended in the well bore W by the slips 26 in the rotary table 25, up and down movement of the drill line 15 and the traveling block 18 to accomplish such drill joint addition does not affect the reading on the totalizer means 35 since the switch 58 in switch means 50 is open during this period as the weight of the joint of drill pipe does not exceed the predetermined minimum weight load on drill line 15 necessary to actuate the mechanism 52 and close switch means 50. However, it can be appreciated that from the foregoing description if the drill string is elevated in the well bore, such raising will act to subtract the total bit depth from the totalizer means 35 since the signal relayed to the measurement means 30 will be in a direction to accomplish such subtraction; however, subsequent lowering of the drill string will add the length of lowering since the signal again is directional and will cause an electrical signal to be provided from the measurement means 30 through the switch means 50 to the totalizer means 35 to reflect the total continuous bit depth.

It is desirable to calibrate the present invention for use on each rig, and this can be accomplished by affixing a measuring tape to the traveling block 18 and moving the traveling block upwardly until any desired number of feet of tape has played out. At the traveling block moves upwardly in the drilling rig, the drill line 15 moves downwardly to reel onto the drum drawworks. During the calibration, the line 55 may be directly coupled with the line 56 to bypass the switch means 50 so that as the traveling block 18 moves upwardly in the drilling mast 5, the pulses are reflected on the digital readout and they are counted. Let it be assumed that during a 90 foot upward travel of the traveling block 18 as measured by the tape attached thereto that the totalizer means 35 counts 900 pulses which would reflect that the sheave 8a rotated enough so that 900 magnets moved by the sensor 31. Thus, by dividing 900 pulses into 90 feet, it is indicated that each time a magnet passes by the sensor 30, this reflect 0.100 foot of travel of the drill line 15. The totalizer means 35 includes a computer counter circuit which can be preset, and based on the foregoing example, the figure of 0.100 would be placed in the computer so that each time the totalizer means 35 receives an additive pulse from the measuring means 30, 0.100 feet will be transmitted to or placed in the computer. Similarly, when the sheave 8a moves in the opposite direction, 0.100 feet will be subtracted in the computer. The computer circuit also includes a memory so that when the number of pulses does not relate to an even number of feet, the amount is properly retained in memory. For example, let it be assumed that each time a magnet moves by the sensor 31, this indicates 0.425 feet. While two would not equal one foot, the third one added to the first two would equal 1.275 feet. The 0.275 feet would be retained in the computer memory so that subsequent pulses reflecting incremental travel of the drill line 15 would be relayed to the totalizer means 35 for display at 37.

It can be appreciated that the measurement means 30 may be positioned at any location to reflect or measure movement of the drill line 15 as an indication of movement up and down in the well bore of the drill string. While the measurement means 30 has been described as being positioned at the top of the rig with the sensor 31 positioned adjacent a sheave 8a with magnets 32 thereon, it can be appreciated that a separate sheave could be mounted on the derrick or drawworks to engage the drill line and accomplish the same results. Similarly, the drill line could be constructed and arranged so that it contains suitable material that could be detected by any type of sensor which would indicate movement of the drill line 15 and provide a pulse to the totalizer means 37 as described hereinabove when the switch means 50 is closed as described herein.

By way of further example, light, laser or any suitable pulse sending mechanism or arrangement may be employed to detect, or related to directional movement of the drill line and supply an energy pulse to suitable totalizing means.

From the foregoing, it can be appreciated that the bit depth at any time is continuously displayed, including trips in and out of the well bore. One bit does not normally drill the hole to total depth. Some wells may be require up to 30 bits or more to reach total depth. To change the bit, all the pipe is pulled out fo the well bore. During these trips it sometimes becomes necessary to know where the bit is. The hole may have ledges or tight spots which require the driller to exercise caution through these areas, but he must known his bit depth to do so.

The same procedure applies when running tubing, casing or any other objects in the well bore. The desired predetermined minimum weight which activates mechanism 52 to close switch 58 in switch means 50 can be set so that switch 58 closes at any predetermined amount above the weight of the traveling block 18, or whatever is to be the reference weight.

The foregoing disclosure and description of the invention are illustrative and explanatory thereof, and various changes in the size, shape and materials as well as in the details of the illustrated construction may be made without departing from the spirit of the invention. What is claimed is:

1. In a method of continuously displaying the total depth of a well string while accommodating raising and lowering the well string supported on a travelling block relative to a crown block on a mast and formed of a plurality of independently rotatable sheaves and wherein a drill line reeved on a drawworks extends around the crown block sheaves and the travelling block with one end of the drill line anchored whereby the travelling block and supported well string may be raised and lowered in a well bore and the total depth of the well string may be continuously measured and displayed at the earth's surface, the steps comprising:
   a. positioning circumferentially spaced detectable means on one of the rotatable sheaves of the crown block;
   b. positioning sensor means to sense the amount and direction of movement of the sheave having detectable means thereon by producing a signal each time one of the detectable means passes the sensor;
   c. communicating totalizer means including a computer control circuit capable of being preset and having memory with the movement measuring means to instrumentally display the continuous total depth of the well string;
   d. coupling control means between the totalizer means and the sensor means, and coupling the control means with the drill line for communicating the signals from the movement measuring means to the totalizer means when the weight of the well string on the drill line exceeds a predetermined amount;
   e. bypassing the control means for communicating signals from the movement measuring means to the sensor means when it is desired to move the drill line longitudinally in the mast a predetermined amount;
   f. instrumentally noting on the totalizer means and the number of signals generated by the movement measuring means during such predetermined longitudinal movement of the drill line as an indication of the number of detectable means passing the sensor means;
   g. determining the amount of longitudinal travel of the drill line for each detectable means that passes the sensor by the expression;
   predetermined longitudinal travel distance of the drill line divided by total number of signals noted by the totalizer means during such predetermined longitudinal travel distance;
   h. presetting the computer counter circuit of said totalizer means with the amount of longitudinal travel of the drill line for each detectable means that passes the sensor means as determined by the immediately preceding recited step;
   i. removing the bypass whereby the control means thereafter controls communication between the sensor and totalizer means means in response to the well string weight when supported on the drill line.

2. In a method of continuously displaying the total depth of a well string while accommodating raising and lowering the well string supported on a travelling block relative to a crown block on a mast and formed of a plurality of independently rotatable sheaves and wherein a drill line reeved on a drawworks extend around the crown block sheaves and the travelling block with one end of the drill line anchored whereby the travelling block and supported well string may be raised and lowered in a well bore and the total depth of the well string may be continuously measured and displayed at the earth's surface, the steps comprising:
   a. positioning circumferentially spaced magnets on one of the rotatable sheaves of the crown block;
   b. positioning movement measuring means including sensor means to electronically sense the amount and direction of movement of the sheave having the magnets thereon by producing an electronic signal each time one of the magnets passes the sensor means;
   c. electronically coupling electronic totalizer means including a computer counter circuit capable of being preset and having memory with the movement measuring means to instrumentally display the continuous total depth of the well string;
   d. electronically coupling a power source to the totalizer means;

e. electronically coupling normally open switch means between the totalizer means and movement measuring means, and coupling the switch means with the drill line to close the switch means and supply power to the movement measuring means when the weight of the well string on the drill line exceeds a predetermined amount;

f. supplying power to the movement measuring means to bypass the switch means when the drill line is moved longitudinally of the mast a predetermined distance;

g. instrumentally noting on the totalizer means the number of electronic signals generated by the movement measuring means during such predetermined longitudinal movement of the drill line as an indication of the number of magnets passing the sensor means;

h. determining the amount of longitudinal travel of the drill line for each magnet that passes the sensor means by the expression:
predetermined longitudinal travel distance of the drill line divided by total number of signals reflected on the totalizer means during such predetermined longitudinal travel distance;

i. presetting the computer counter circuit of said totalizer means with the amount of longitudinal travel of the drill line for each magnet that passes the sensor means as determined by the immediately preceding recited step;

j. removing the power bypass to the movement measuring means whereby the switch means thereafter controls the supply of power to the movement measuring means in response to the well string weight when supported on the drill line.

3. Apparatus for displaying the total depth of an object supported in a well bore by a cable line reeved around at least one rotatable sheave means supported on a mast including:
movement measuring means for sensing the amount and direction of movement of the cable line around the sheave means said movement measuring means including:
detectable means mounted at equally spaced circumferential postions on the sheave means; and
sensor means for responding to said detectable means to produce a signal in response to movement of the sheave means with the cable line thereon;
totalizer means including computer means capable of being preset and having memory for displaying the total depth of the object;
coupling means including communicating means for communicating the signals from said sensor means to said totalizer means only when the weight of the object supported by the cable line exceeds a predetermined amount;
means for maintaining said communicating means operative to bypass said coupling means when it is desired to move the cable line a predetermined longitudinal amount relative to the mast with the weight of the object supported by the cable line less than said predetermined amount; and
means for instrumentally noting on said totalizer means the number of signals transmitted by said sensor means during such predetermined cable line longitudinal movement as an indication of the amount of longitudinal travel of the cable line for each detectable means whereby said computer means may be preset with the amount of longitudinal travel of the cable line for each detectable means that passes said sensor means.

4. Apparatus for displaying the total depth of an object supported in a well bore by a cable line reeved around at least one rotatable sheave means including:
movement measuring means for sensing the amount and direction of movement of the cable line around the sheave means said movement measuring means including:
detectable means mounted at equally spaced circumferential postions on the sheave means; and
sensor means for responding to said detectable means to signal rotation of the sheave means with the cable line thereon;
totalizer means including computer means capable of being preset and having memory for displaying the total depth of the object;
coupling means for communicating the signals from said sensor means to said totalizer means when the weight of the object supported by the cable line exceeds a predetermined amount;
coupling means for interrupting the signals from said sensor means to said totalizer means when the weight of the object supported by the cable line is less than said predetermined amount;
means for bypassing said coupling means when it is desired to move the cable line a predetermined longitudinal amount so that said sensor means remains coupled to communicate signals to said totalizer means as an indication of the total number of detectable means sensed by said sensor means during such predetermined cable line longitudinal movement; and
means for instrumentally noting on said totalizer means the number of signals sensed by said sensor means during such predetermined cable line longitudinal movement as an indication of the amount of longitudinal travel of the cable line for each detectable means whereby said computer means may be preset with the amount of longitudinal travel of the cable line for each detectable means that passes said sensor means.

5. In a method of continuously displaying the total depth of an object in a well bore while accommodating raising and lowering the object supported on a cable line reeved around at least one rotatable sheave means, the steps of:

a. positioning circumferentially spaced detectable means on one of the rotatable sheave means;

b. positioning sensor means to sense the amount of movement of the sheave means by producing a signal each time one of the detectable means passes the sensor means;

c. communicating totalizer means including a computer counter circuit capable of being preset and having memory with the sensor means to instrumentally display the continuous total depth of the well string;

d. moving the cable line longitudinally a predetermined amount; and e. receiving in the totalizer means the number of signals generated by the sensor means during such predetermined longitudinal movement of the drill line as an indication of the number of detectable means passing the sensor means whereby the totalizer means may be preset with the amount of longitudinal movement of the cable line for each detectable means that passes said sensor means.

6. Apparatus for continuously displaying the total depth of an object supported in a well bore on a cable line reeved around rotatable sheave means comprising:
movement measuring means for sensing the amount and direction of movement of the cable line around the sheave means;
   detectable means mounted at equally spaced circumferential positions on the sheave means; and
   sensor means for sensing the amount and direction of movement of the cable line that extends around the sheave means by producing a signal in response to said detectable means;
totalizer means including means capable of being preset and having memory for responding to said movement measuring means to instrumentally display the continuous total depth of the well string;
means for coupling a power source to said totalizer means;
normally open switch means;
means for coupling said normally open switch means between said totalizer means and said movement measuring means and for coupling said switch means with the cable line for supplying power to said movement measuring means when the weight of the object on the cable line exceeds a predetermined amount;
means operable to bypass said switch means for supplying power to said movement measuring means and for coupling said movement measuring means to said totalizer means when the cable line is moved longitudinally relative to the mast a predetermined amount; and
means for instrumentally noting on said totalizer means the number of detectable means sensed by said sensor means during such predetermined longitudinal movement of the cable line whereby said totalizer means may be preset with the amount of longitudinal movement of the drill line for each detectable means that passes said sensor means.

7. In apparatus for displaying the total depth of an object supported in a well bore by a line reeved around at least one sheave means wherein movement measurement means include detectable means mounted at circumferentially spaced positions on the sheave means which detectable means are sensed by sensor means for communicating a signal to totalizer means capable of being preset and having memory for responding to the signals to instrumentally note the total depth of the well, the invention including:
   means for communicating the signals from the sensor means to the totalizer means as the line is moved longitudinally relative to the mast a predetermined distance; and
   means in said totalizer means for determining the number of detectable means sensed during such predetermined longitudinal movement of the drill line whereby said totalizer means may be set with the amount of longitudinal movement of the line for each detectable means that passes said sensor means.

8. Apparatus for displaying the total depth of an object supported in a well bore by a cable line reeved around at least one sheave means supported on a mast including:
movement measuring means for sensing the amount and direction of movement of the cable line around the sheave means said movement measuring means including:
   detectable means mounted at equally spaced circumferential positions on the sheave means; and
   sensor means for responding to each said detectable means to signal rotation and direction of the sheave means;
totalizer means including computer means capable of being preset and having memory for displaying the total depth of the object;
transmission means for transmitting the signal from said sensor means to said totalizer means only when the weight of the object supported by the cable line exceeds the predetermined amount and for interrupting the transmission of the signal from the sensor means to said totalizer means only when the weight of the object supported by the cable line is less than a predetermined amount;
means for bypassing said transmitting means when it is desired to move the cable line a predetermined longitudinal amount so that said movement measuring means remains coupled to transmit signals to said totalizer means as an indication of the number of detectable means sensed by said sensor means during such predetermined cable line longitudinal movement; and
means for instrumentally noting on said totalizer means the number of signals sensed by said sensor means during such predetermined cable line longitudinal movement as an indication of the amount of longitudinal travel of the cable line for each detectable means whereby said computer means may be preset with the amount of longitudinal travel of the cable line for each detectable means that passes said sensor means.

* * * * *